Feb. 23, 1932. C. MACBETH 1,846,342
MACHINERY FOR WINDING A STRAND SUCH AS THE THREAD OF
ELASTIC INDIA RUBBER USED IN THE MANUFACTURE
OF THE CORE OF A GOLF BALL
Filed April 13, 1927 7 Sheets-Sheet 1

Inventor
Colin Macbeth
By D. Singer, Atty.

Feb. 23, 1932. C. MACBETH 1,846,342
MACHINERY FOR WINDING A STRAND SUCH AS THE THREAD OF
ELASTIC INDIA RUBBER USED IN THE MANUFACTURE
OF THE CORE OF A GOLF BALL
Filed April 13, 1927 7 Sheets-Sheet 2
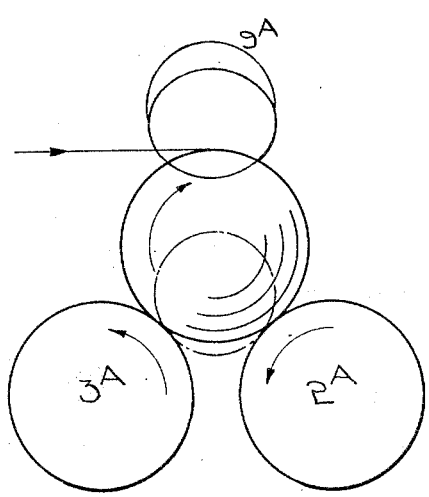
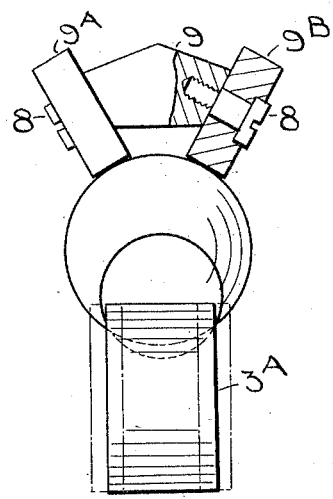
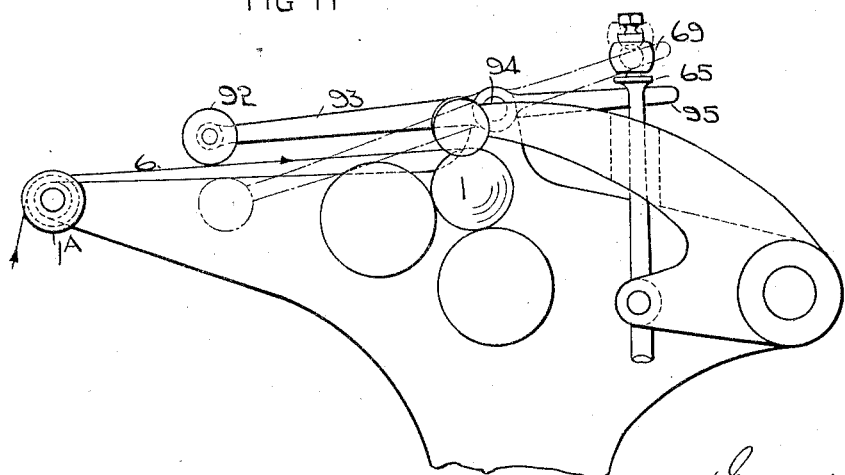

Feb. 23, 1932.  C. MACBETH  1,846,342
MACHINERY FOR WINDING A STRAND SUCH AS THE THREAD OF
ELASTIC INDIA RUBBER USED IN THE MANUFACTURE
OF THE CORE OF A GOLF BALL
Filed April 13, 1927     7 Sheets-Sheet 3
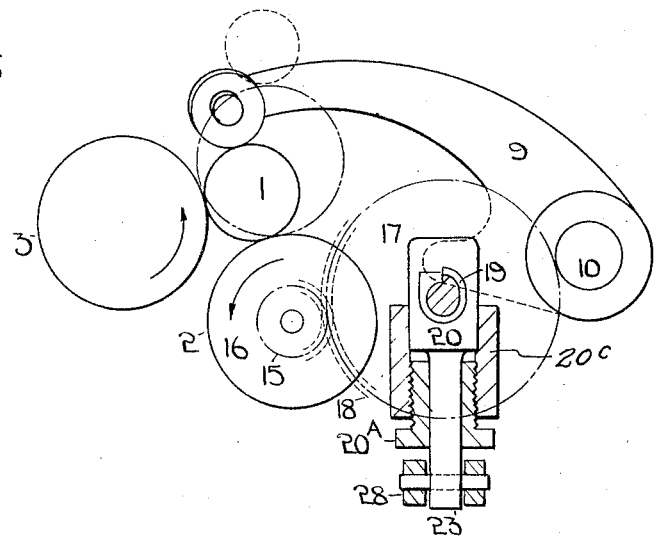
Fig 5
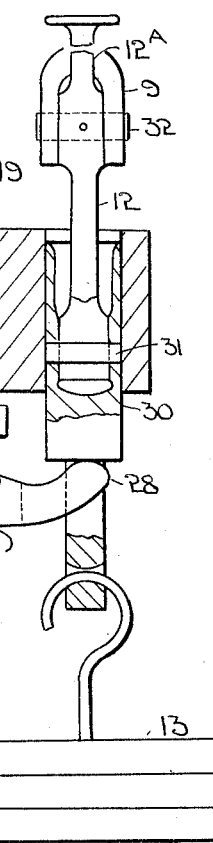
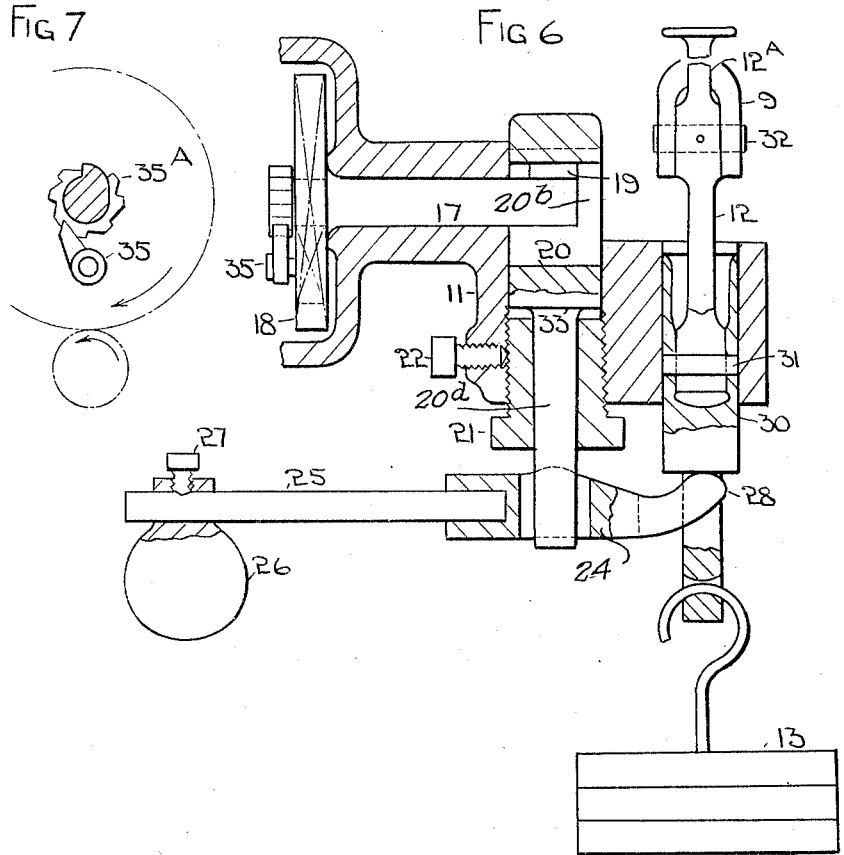
Fig 7
Fig 6

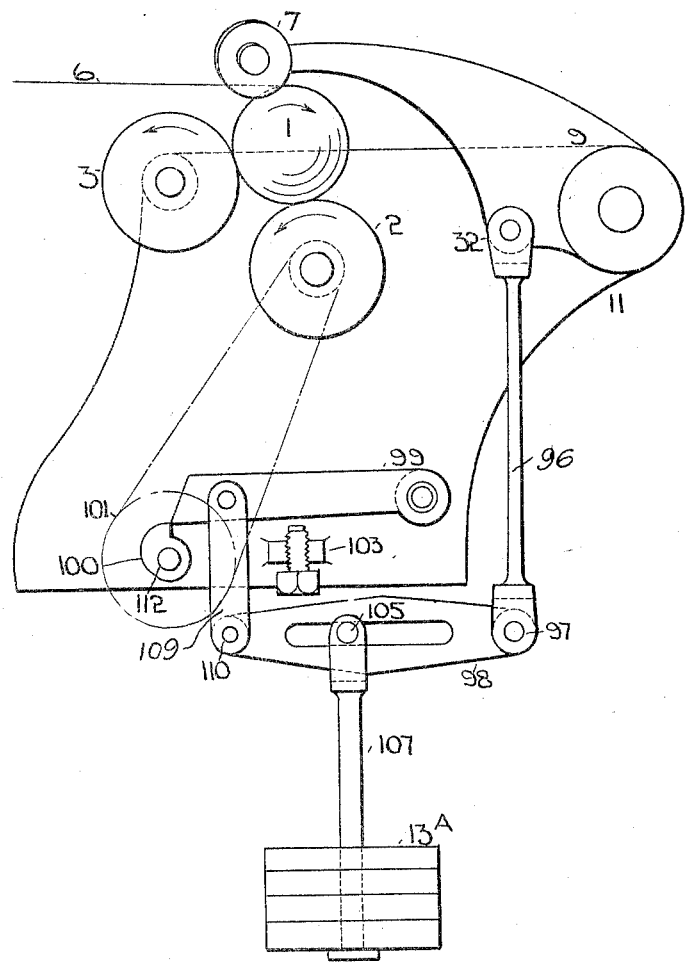

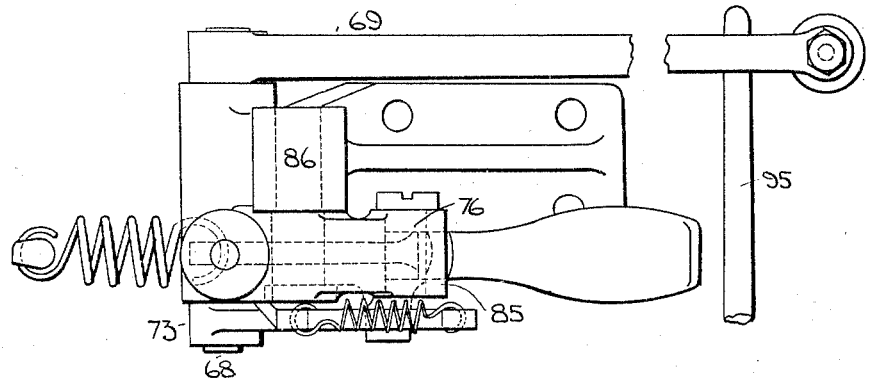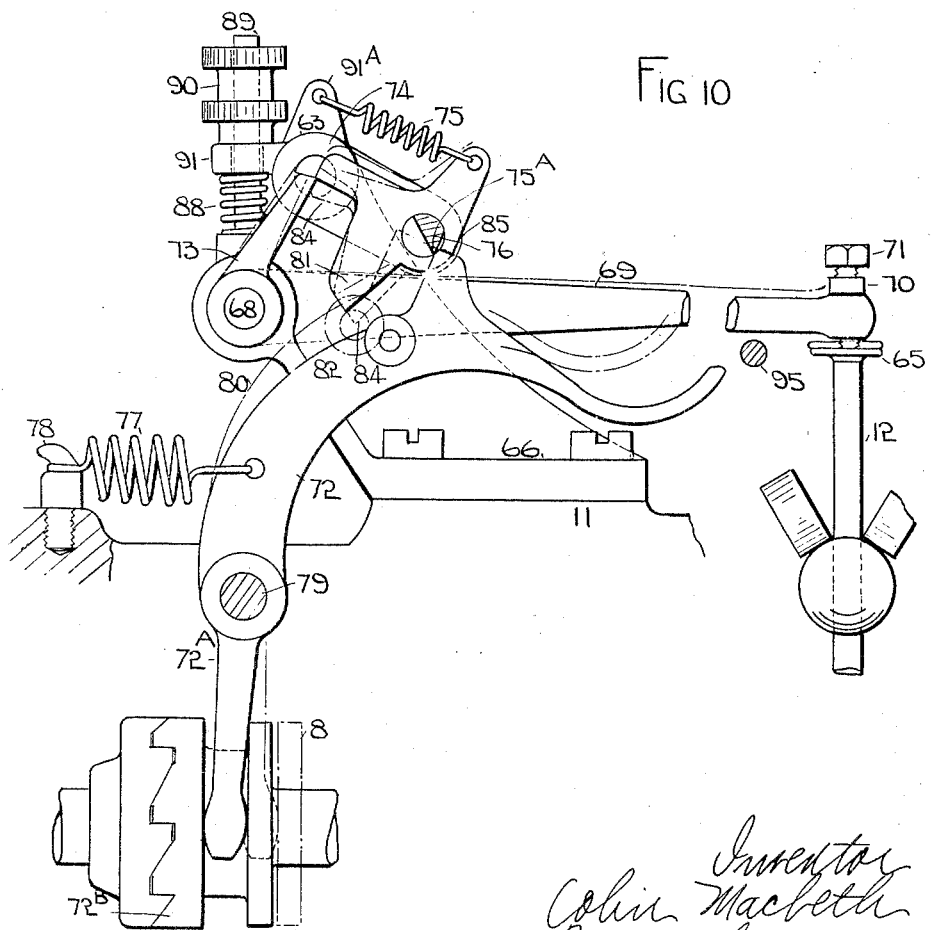

Feb. 23, 1932.  C. MACBETH  1,846,342
MACHINERY FOR WINDING A STRAND SUCH AS THE THREAD OF
ELASTIC INDIA RUBBER USED IN THE MANUFACTURE
OF THE CORE OF A GOLF BALL
Filed April 13, 1927   7 Sheets-Sheet 6
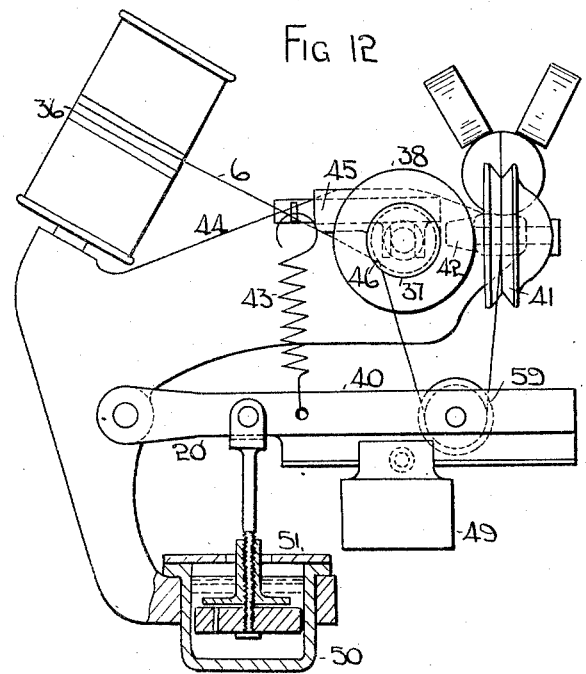
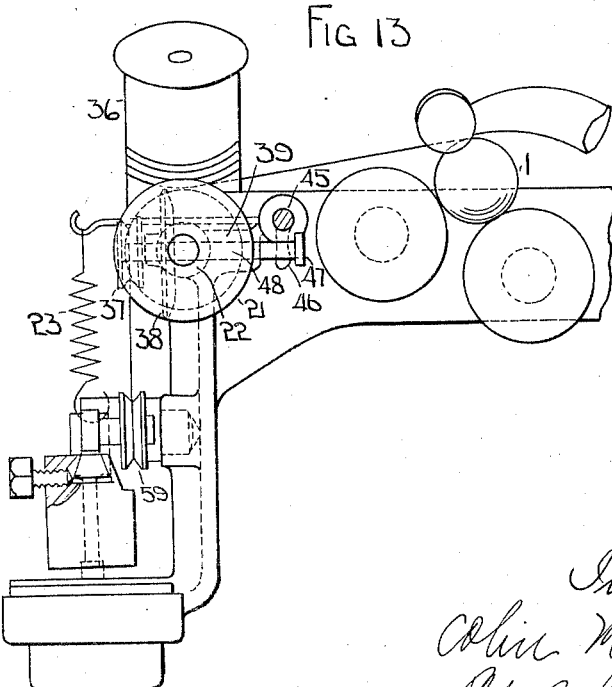

Feb. 23, 1932.  C. MACBETH  1,846,342
MACHINERY FOR WINDING A STRAND SUCH AS THE THREAD OF
ELASTIC INDIA RUBBER USED IN THE MANUFACTURE
OF THE CORE OF A GOLF BALL
Filed April 13, 1927  7 Sheets-Sheet 7

Patented Feb. 23, 1932

1,846,342

UNITED STATES PATENT OFFICE

COLIN MACBETH, OF FOUR OAKS, BIRMINGHAM, ENGLAND, ASSIGNOR TO DUNLOP RUBBER COMPANY LIMITED, OF LONDON, ENGLAND, A COMPANY OF GREAT BRITAIN

MACHINERY FOR WINDING A STRAND SUCH AS THE THREAD OF ELASTIC INDIA-RUBBER USED IN THE MANUFACTURE OF THE CORE OF A GOLF BALL

Application filed April 13, 1927, Serial No. 183,561, and in Great Britain June 3, 1926.

This invention relates to improvements in machines for winding threads or strands to produce a body of spherical or substantially spherical form and more especially for winding elastic thread for the production of the cores of golf and other balls, the object of the invention being to provide an improved machine of this kind which is automatic in operation, which requires but little attention on the part of the operative, which is not likely to get out of order and which embodies in its construction means for winding the thread; means for periodically relaxing its pressure upon the work to permit free movement of the work such as is required from time to time during the operation of the machine to enable the work to attain and retain true spherical form; to appropriately tension the thread during the winding process; to stop the operation of the machine when the work attains the desired predetermined diameter and to also automatically stop the operation of the machine in the event that the thread should break.

With the above and other objects in view, the invention consists in the construction, combination and arrangement of devices hereinafter described and claimed.

In order that this invention may clearly be understood and readily carried into practice, reference may be had to the appended explanatory drawings on which:—

Figure 3 is a detail view partly in end elevation of the arm 9 and partly in section and illustrating the rollers on the cantilever end of said arm which bear on the work sphere.

Figure 4 is a diagram illustrating Figure 3, the aspect of elevation being at right-angles to that obtaining in the case of the figure last mentioned.

Figure 5 is a detail sectional view, partly diagrammatically, of the mechanism shown in Figure 1, but on a different vertical section plane.

Figure 6 is a sectional view approximating the mechanism shown in Figures 1 and 5, a detail of which is shown in axial elevation at Figure 7.

Figure 8 is an elevation of a modified form of the invention.

Figure 9 is a plan and Figure 10 is an elevation partly in section of controlling mechanism.

Figure 11 is a view corresponding approximately with Figure 1 and illustrating one suitable form of mechanism which may function in the event of breakage of the strand.

Figure 12 illustrates in elevation one construction of tensioning mechanism for the machine. Figure 13 is a similar view of the same at right angles thereto.

Figure 2:
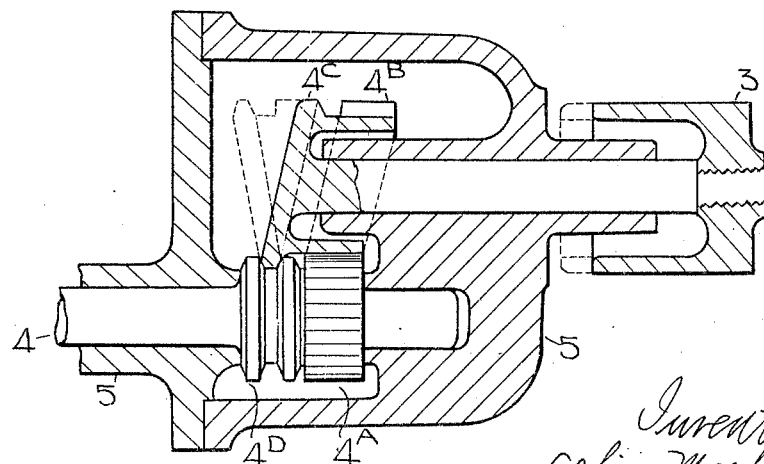
Figure 2 is a sectional elevation of a drive mechanism for one of the supporting rollers for the sphere.

In a convenient embodiment of the present invention as illustrated in the drawings, I provide a roller 2 adapted positively to be rotated, but which in the embodiment shown has no axial movement. This roller 2 co-operates with another roller 3 which is arranged in a somewhat higher plane than that of the roller 2. This roller 3 is adapted not only to be positively driven but also to be reciprocated axially. A suitable mechanism for this purpose is shown in Figure 2 wherein a driving shaft 4 is provided with a spur wheel $4^a$ which meshes with a spur wheel $4^b$ having a skew cam $4^c$ and being on a shaft $3^a$ carrying the roller 3. This skew spur wheel $4^b$ is furnished with a flange formation $4^e$ which co-operates with an annular groove $4^d$ appertaining to the spur wheel $4^a$, so that the drive from the primary shaft 4 imparts to the roller 3 not only a rotary motion but also a reciprocating axial motion.

My numeral 1 designates the sphere constituting the work and this sphere is pressed downwardly in the construction shown by an arm 9 which carries at its cantilever extremity two rollers 9ª 9ᵇ particularly shown in Figure 3, said rollers being simply installed as for instance by spindle screws 8. These rollers 9ª 9ᵇ are located with their main planes approximately radii of the work. The axis of the cantilever arm 9 is also so located that the rollers 9ª 9ᵇ are applied to the upper part of the sphere approximately on the side of the latter diagrammatically remote from the point of contact of the sphere with the non-oscillating roller 2, the arrangement being such that these conditions approximately obtain throughout progress of increase in the diameter of the work. This is illustrated diagrammatically in Figure 1 in which figure it will be seen in the two dimensions which the work may assume the point of contact of the upper rollers occurs at or approximately at a point occurring in a line or plane between the axes of the upper pressure rollers and the axes of the supporting roller 2. The line between the axis of oscillation of the cantilever arm 9 and the centre of the pressure rollers 7 may be adapted approximately to maintain a constant angle with the line between the said centre of the pressure rollers and the centre of the non-oscillating supporting roller 2 as indicated in Figure 1.

Figure 1:
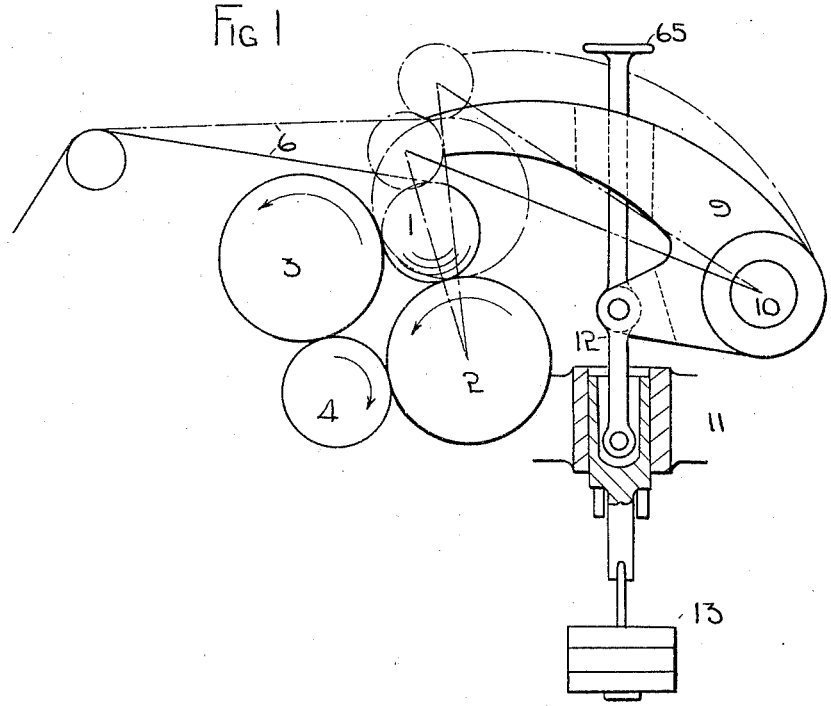
Figure 1 is a diagrammatic view illustrating a part of the mechanism from an aspect located axially of the supporting rollers in relation to which the sphere is manipulated.

As shown in Figure 2 an axially oscillating roller such as 3 in the arrangement indicated in Figure 1 or in the arrangement indicated in Figure 4 may be of hollow formation having a skirt which embraces the projecting bearing for its spindle 3ª and conduces to compactness in construction as shown in Figure 2.

It will be noted from Figure 3 that the peripheries of the rollers 9ª 9ᵇ are tangential to the surface of the work and this tangential location continues during all periods of the diametrical expansion of the work.

In the foregoing description I have referred to Figure 3 as indicating the rollers 9ª and 9ᵇ which may be utilized at the extremity of the cantilever arm 9 shown in Figure 1, but the scheme illustrated in Figures 3 and 4 differs from that illustrated in Figure 1 in that the two lower rollers 2ª 3ª are both adapted to be positively driven and also to be axially reciprocated. This arrangement lends itself to conditions in which I may apply an automatic pressure mechanism to existing machines.

Provision for intermittently relieving the work from the pressure exerted by the pressure rollers carried by the cantilever arm 9 may vary considerably, but an improved mechanism is illustrated in Figures 1, 5 and 6, wherein the spindle of the shaft 16 of the non-oscillating supporting roller 2 carries a spur wheel 15 which meshes with a spur wheel 18 on a shaft 17 carrying a cam 19 co-operating with a slide 20 in manner such that by rotation of the shaft 17 the slide 20 gradually is raised and subsequently allowed to descend upon the passage of a shoulder 19ª upon the cam 19, beyond a shoulder 20ª provided in an opening 20ᵇ in the slide 20 inside which opening said cam 19 operates. The slide 20ᶜ is incorporated within a housing 20 and is retained by a bush 21. This bush is adjustable axially of the stem 20ᵈ to limit the movement of the latter and below the bush 21 the stem 20ᵈ has at 23 a pivotal co-operation with a lateral arm or lever 24 and 25 which latter carries a weight 26 adjustable by a set screw 27 longitudinally of the lever. 22 is a set screw for locking the bush 21 in its adjusted position. The arm 24 of the lever 24—25 is adapted to co-operate with the underside of a plunger 30 which at 31 is pivotally coupled to upwardly extending link 12 which at 32 is pivoted to the arm 9 carrying the pressure rollers. The plunger 30 may be provided with a weight 13 and the operation of the apparatus is thus as follows:—In the construction shown the member 20 is elevated until the shoulder upon the cam 19 escapes that with which 20 is provided with a result that the member 20 is enabled suddenly to descend under the influence of the weight 26. Upon impact of the enlarged portion of the member 20 with the upper face of the bush 21, the inertia attending the load 26 has the effect of momentarily counteracting the downward pressure on the plunger 30 so that the pressure on rollers 7 is relieved from the work sufficiently to allow the latter to assume a new position.

I may employ a pawl and ratchet drive 35, 35ª between the driving wheel 18 in the shaft 17 so that in the occasional event of reverse motion of the mechanism there is no possibility of jamming as a result of the undue engagement of the shoulder on the cam 19 with that on the member 20 with which it co-operates.

In the foregoing the mechanism for fulfilling the nodding function already described is characterized by an arrangement wherein the release of the pressure rollers is attended with a percussive action, but in lieu of such percussive action other expedients may be employed to provide for relaxation of the pressure upon the work. One such arrangement is illustrated in Figure 8 wherein the cantilever arm 9 carrying the pressure rollers is coupled pivotally at 32 by a link 96 by an articulate connection at 97 to a floating link 98 which in turn is coupled by an articulating connection at 110 with another link at 109 to a pivoted member 99 which co-operates with a cam 100 mounted upon a shaft 112. Between the shaft 112 and the source of power constituting the shaft of the non-oscillating supporting roller 2, a reduction gear is provided. The cam 100 is thus enabled to rotate in a counter-clockwise direction with the result that when the shoulder of the cam allows the arm 99 to drop suddenly, the weight 13 is free to fall a pre-determined distance so that there is a momentary reduction of the pressure on the work until the action of gravity again enables the load 13ª to apply the necessary pressure to the work. The core is thus enabled to assume its new axis in the desired manner. 103 is a set screw for adjustably limiting the descent of the lever 99. The load 13ª is coupled to the floating lever 98 through the intermediary of suspender 107 which is adjustably and pivotally connected to the floating lever 98 by a pin and slot pivotal connection 105 in manner such as to permit of an adjustment of the point of articulation of the suspended load with the floating lever longitudinally of the latter. By varying the location of the articulation at 105 in the length of the floating lever 98 a further convenient adjustment of the pressure is permitted. After the lever 99 has descended upon the screw 103 the cam is enabled gradually to raise the said lever 99 without appreciably affecting the normal load on the work.

The weight 13 Figure 6 or 13ª Figure 8 may be varied as required to suit different types of work, particularly having in view the hardness of the centres on which the cores are built in cases in which the machine is utilized in the manufacture of golf balls and in the embodiment shown in Figure 6 the strength of the hammer blow may readily be varied by adjusting the position of the weight 26 as by virtue of the set screw 27. When in the arrangement shown in Figure 6 the load 13 is altered it is desirable to make a corresponding adjustment at 27 to regulate the hammer blow.

In order accurately to control and determine the ultimate diameter of the wound core, I employ improved means for stopping the machine automatically when the ball acquires the desired diameter. A feature of this part of my invention resides in my utilization of a relay mechanism primarily having for its purpose to conduce to delicacy of operation, but with the additional advantage of durability in the mechanism fulfilling the function. I obtain this desideratum by utilizing a lever which is actuated by or in accordance with the expansion of the sphere under production, such lever being incorporated in manner such that its arm thus primarily actuated is relatively of considerable length, so that a substantial degree of mechanical advantage in actuation of the automatic stopping function is thereby attained. The pressure on the work is thus not appreciably impaired by the function which this means has directly or indirectly to fulfil in bringing about a stoppage of the machine upon arriving at the desired diameter. In the means for carrying out this part of my invention which is shown in Figures 9 and 10 of the drawings, the lever in question is actuated from the cantilever arm 9 through the intermediary of an extension of the member 12 which is formed at its head with an enlargement 65. This enlargement is adapted to co-operate with a lever arm 69 through the intermediary of an engaging screw 71 adapted to be fixed by a lock nut 70 and the arm 69 which is pivoted at 68 upon any suitable bracket such as 66 on the frame 11 of the machine also carries a toothed arm 73 adapted to co-operate with the tooth of a detent 74 which latter is mounted to oscillate about the axis 76. When the arm 69 is raised the arm 73 slips out of engagement with the end of the detent 74 with the result that the face of the latter assumes the position indicated at 84 under the influence of a spring 75 and another tooth 76ª which is rigid with the detent 74 is by virtue of the displacement of the latter disengaged from a tooth 87 on a lever 72 pivoted at 79 to oscillate about a fixed axis, which lever 72 has an extension 72ª which co-operates with any suitable clutch 72ᵇ adapted automatically to disengage the machine from its source of driving power. 77 is a spring which controls the lever 72 which is connected suitably to any appropriate anchorage such as 78 mounted in the main frame of the machine. After being tripped the detent 74 may come to rest by engagement with the arm 72 as shown by dotted line 84ª. Upon disengagement of the clutch the detent assumes the position shown in dotted lines 81, while the clutch assumes the position indicated by dotted lines 80.

For convenience in re-engaging the clutch it is necessary for the tooth 76 to be displaced out of the path of the tooth 87 and for this purpose I arrange the axis of the tooth 76 as a floating one. For this purpose the said axis is mounted upon an arm 85 of a lever, the other arm 91 of which is adapted to encircle a stem 89 carrying stop elements 90 which are adjustable and which rod 89 is also encircled by a coiled spring 88 which operates between the arm 91 and a suitable abutment. The spring 75 controlling the movement of the detent 74 may for convenience be coupled to an arm 91ª appertaining to the lever 85—91.

Still another feature of my present invention attends the fact that it incorporates an automatic stopping mechanism for the machine in the event of the strand breaking and in connection with the function of this part of the mechanism I am able to make use of the same with the relay mechanism for automatically stopping the machine upon obtainment of the desired diameter. Thus my present invention embraces the utilization of a relay mechanism for use in automatically stopping the machine in the event of breakage of the strand. One embodiment is shown in Figure 11 wherein I arrange a roller 92 adapted to rest upon the strand in the part thereof between the work 1 and the delivery pulley 1ª which roller 92 is carried by an arm 93 of a lever pivoted at 94 and having another arm 95 which co-operates with the arm 69 as shown in Figures 9 and 10.

The load at 92 can thus be of a relatively light character so that it cannot interfere appreciably with the guidance of the tensioned strand, while since the arm 93 co-operates with the relay clutch release mechanism, one can be assured of a certain release of the clutch in the event of a breakage of the strand.

In construing the foregoing description it will be appreciated that the winding of the strand in the production of the work occurs primarily by the effort exerted by the drum-like members or equivalent rotary members in conjunction with the pressure provision and that it is necessary to offer a suitable resistance to the strand as it is supplied so that it shall be subjected to a proper tension.

As illustrated in Figures 12 and 13, 36 represents a supply bobbin from which the strand of elastic rubber is adapted to extend and pass one or more times around a pulley 37 from which pulley 37 the strand extends downwardly to a pulley 59 from which it extends upwardly to a pulley 41, from which latter it extends to the work 1. The pulley 37 is rigidly mounted in conjunction with a disc 38 which as shown in Figure 2 has a conical surface adapted to co-operate with a cone 42 shown in 12, said cone being rigid with the pulley 41, so that normally the latter is driven frictionally through the cone drive 38—42. The pulley 59 is mounted upon a weighted cantilever arm 40 loaded at 49, so that said lever 40 fulfils the primary function of tensioning the strand. The lever 40 is in turn connected by a spring 43 to an arm 44, which latter has a second forked arm 46 adapted to co-operate with a collar 47 on the shaft 48 carrying the coned disc 38, so that by virtue of the load 49, the said disc is maintained in frictional contact with the conical friction member 42 for the appropriate driving of the pulley 41. If, however, the strand is subjected to undue tension the arm 40 is automatically lifted, with the result that by reason of the relaxation of the spring 43, the lever 44 is enabled to rise, thus relaxing its pressure upon the collar 47 of the spindle 48 appertaining to the coned disc 38 and a slipping of the friction clutch 38—42 thus ensues with the result and advantage that breakage of the strand by undue tension is avoided.

The load 49 is adjustably mounted upon the cantilever arm 40 in order to permit a modification of leverage and in order to avoid erratic actuation of the lever 40 the latter may co-operate with a dashpot system consisting of a dashpot piston 51 of any approved form working in an oil container.

Figure 14:
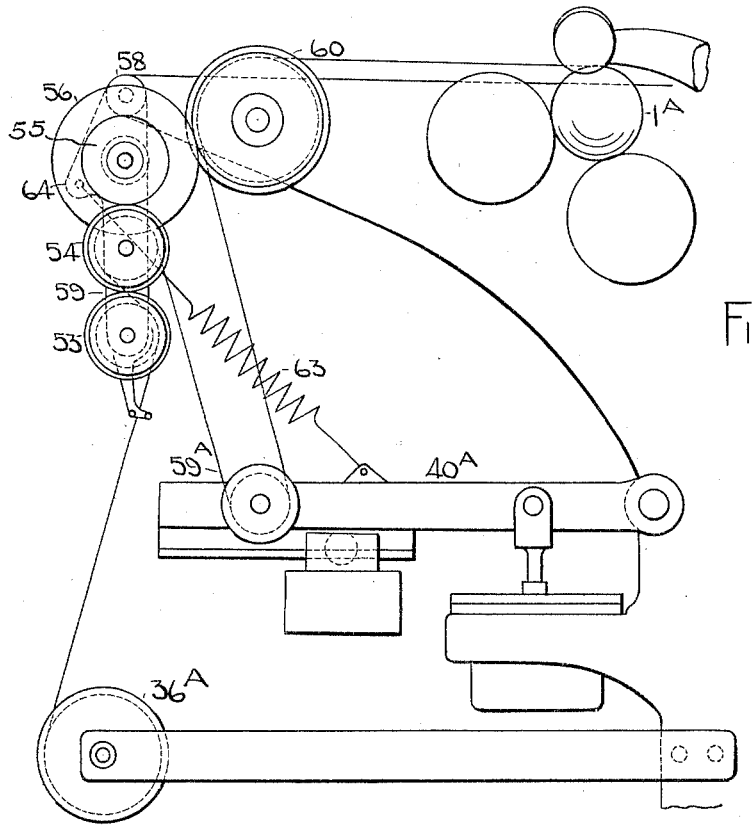
Figure 14 is an elevation of a modified tensioning mechanism according to the invention, Figure 15 being an elevation of part of the mechanism shown in Figure 14, the aspect of elevation being at right-angles to that in the case of the figure last mentioned.
Figure 15:
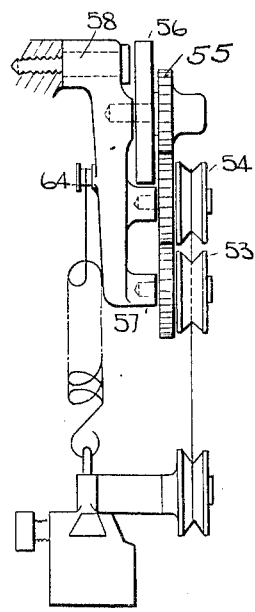

In the embodiment shown in Figures 14 and 15, 36ª is the supply bobbin from which the strand is adapted to pass successively around pulleys 53 and 54 which are geared together in the manner indicated in dotted lines in Figure 3 after which it passes around a pulley 60 having a fixed axis and thence to the work 1ª. Between the pulley 55 and the pulley 60, however, the strand is adapted to descend and pass around a pulley 59ª which fulfils several functions already described in connection with the modification illustrated in Figures 12 and 13.

Geared with the pulley 54 is a friction disc 56 which is adapted to engage with a friction disc 61 mounted rigidly with the pulley 60. The three pulleys 53, 54 and 55 are all mounted on a swinging arm 57 pivoted on pivot pin 58 which arm 57 is coupled by a spring 63 to the arm 40ª and the arrangement is such that in the event of undue tension being imparted to the strand the frictional drive between the member 56 which rotates with the pulley 55 and the member 61 which rotates with the pulley 60 is relaxed, thus avoiding the possibility of rupture of the strand.

The gearing may be such that before the strand arrives at the loaded pulley 59 or 59ª it may be stretched in a degree approaching its elastic limit, while after it has passed beyond the pulley 59 or 59ª it may be tensioned in a much higher degree while still within its breaking limit.

In addition to comprehending a complete machine incorporating a tensioning mechanism having the characteristics already defined, the present invention comprehends a tensioning mechanism applicable to existing machines whereby the tensioning gear according to my present invention may be applied in order to convert the existing machine into a machine having the characteristics which attend my present invention.

Having described my invention, what I claim and desire to secure by Letters Patent is:—

1. In a machine for winding a thread or strand to produce a spherical body, means for supporting and rotating the work and comprising a positively rotated roller and a positively rotated and reciprocated roller; means for applying pressure to the work and comprising a weighted and pivoted lever bearing at its free end on said work, and means whereby said lever is raised spasmodically and comprising a cam, a slide raised and lowered by said cam, a lever pivoted to said slide and a link connected to the weighted arm and cooperating with the end of the pivoted lever.

2. In a machine for winding thread to produce a spherical body, means for supporting the work and comprising a positively rotated roller and a positively rotated and reciprocated roller, the means for reciprocating the latter comprising a driving shaft, a spur-wheel on said driving shaft, a skew spur wheel on the roller spindle engaging with said spur wheel on said driving shaft, the latter having an annular groove adjacent said spur wheel, and said skew spur wheel having means engaging said annular groove.

3. In a machine for winding thread to produce a spherical body, means for pressing the work downwardly onto its supporting rollers, comprising a weighted arm, a pair of rollers located on the cantilever end of said arm and pressing on the upper part of the work, said rollers being located with their main planes approximating radii of the work.

4. In a machine for winding thread to produce a spherical body, means for pressing the work on its supporting rollers and means for periodically removing said pressure from the work, said means comprising a rotating cam, a slide cooperating with said cam, an arm pivoted to a stem on said slide, an adjustable weight on one end of the arm, a plunger raised and lowered by the other end of the arm, and a link pivotally connected at its lower end to the plunger and at its other end to the said pivoted arm whose cantilever end rests on the top of the work.

5. In a machine for winding thread to produce a spherical body, means for periodically and instantaneously removing the pressure from the work, said means comprising a rotating cam, a slide cooperating with said cam, a bush surrounding the depending stem of the slide and means for locking said bush in any desired position within its housing, an arm pivoted to the lower end of the depending stem, an adjustable weight on one end thereof and a plunger adapted to be raised and lowered by the other end thereof, said plunger being directly connected to a pivoted lever whose cantilever end rests on the top of the work.

In witness whereof I affix my signature.

COLIN MACBETH.